(12) United States Patent
Kotani et al.

(10) Patent No.: US 8,822,087 B2
(45) Date of Patent: Sep. 2, 2014

(54) METAL-AIR BATTERY AND METHOD FOR MANUFACTURING THE METAL-AIR BATTERY

(75) Inventors: Yukinari Kotani, Susono (JP); Fuminori Mizuno, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 585 days.

(21) Appl. No.: 12/674,810

(22) PCT Filed: Oct. 30, 2008

(86) PCT No.: PCT/JP2008/069761
§ 371 (c)(1),
(2), (4) Date: May 7, 2010

(87) PCT Pub. No.: WO2010/050028
PCT Pub. Date: May 6, 2010

(65) Prior Publication Data
US 2011/0200891 A1    Aug. 18, 2011

(51) Int. Cl.
*H01M 8/22*  (2006.01)
*H01M 4/36*  (2006.01)
*H01M 4/42*  (2006.01)
*H01M 8/08*  (2006.01)
*H01M 8/00*  (2006.01)
*B31C 1/00*  (2006.01)
*B65H 81/00*  (2006.01)
*B29C 70/34*  (2006.01)
*H01M 4/38*  (2006.01)
*H01M 12/08*  (2006.01)

(52) U.S. Cl.
CPC .............. *H01M 12/08* (2013.01); *H01M 4/382* (2013.01); *Y02E 60/128* (2013.01)
USPC .......... 429/405; 429/403; 429/406; 429/498; 429/535; 156/184; 156/191

(58) Field of Classification Search
USPC ......... 429/400, 402, 403, 405, 406, 407, 498, 429/535; 156/60, 184, 185, 187, 191
See application file for complete search history.

(56) References Cited

U.S. PATENT DOCUMENTS 5,476,730 A  *  12/1995  Okamura et al. ............. 429/405
2004/0197641 A1 * 10/2004  Visco et al. .................. 429/137

FOREIGN PATENT DOCUMENTS

| JP | A 2-051876 | 2/1990 |
| JP | A 8-504998 | 5/1996 |

(Continued)

OTHER PUBLICATIONS

International Search Report issued in corresponding International Application No. PCT/JP2008/069761, mailed Dec. 22, 2008 (with English-language translation).

*Primary Examiner* — Philip Tucker
*Assistant Examiner* — Brian R Slawski
(74) *Attorney, Agent, or Firm* — Oliff PLC

(57) ABSTRACT

The present invention is to provide a metal-air battery which can inhibit decrease of discharge capacity and increase of battery's internal resistance caused by the repeated charge and discharge. The metal-air battery comprises: a cathode; an electrolyte layer; and an anode, wherein the cathode, the electrolyte layer, and the anode are laminated in the order mentioned; the cathode comprises a plurality of cathode material layers arranged at intervals; and the direction for laminating the cathode, the electrolyte layer, and the anode intersect with the array direction of the plurality of cathode material layers.

13 Claims, 5 Drawing Sheets

(56) References Cited

FOREIGN PATENT DOCUMENTS

| JP | A 9-500480 | 1/1997 |
| JP | A 2006-190522 | 7/2006 |
| JP | A 2007-513464 | 5/2007 |
| JP | A 2008-112724 | 5/2008 |
| JP | A 2008-198590 | 8/2008 |
| WO | WO 94/10714 | 5/1994 |
| WO | WO 94/29908 | 12/1994 |

* cited by examiner

METAL-AIR BATTERY AND METHOD FOR MANUFACTURING THE METAL-AIR BATTERY

TECHNICAL FIELD

The present invention relates to a metal-air battery and a method for manufacturing the metal-air battery. More particularly, the invention relates to a metal-air battery which can inhibit decrease of discharge capacity and increase of battery's internal resistance caused by the repeated charge and discharge; the invention also relates to a method for manufacturing the above-mentioned metal-air battery.

BACKGROUND ART

A metal-air battery is a battery, wherein redox reaction of oxygen as the cathode active material is carried out in the cathode, and redox reaction of a metal constituting the anode is carried out in the anode; thereby charge and/or discharge can be performed. The metal-air battery shows high energy density and enables downsizing easily so that it has attracted attention as a higher-capacity secondary battery superior to the conventional lithium-ion secondary battery. However, the metal-air battery is still problematic as a secondary battery and has many other problems which are raised by increasing the size of the battery itself for applying to automobiles.

For example, at charging and discharging of the metal-air battery, gas generates inside the battery. This is attributed to the above-described redox reaction, decomposition of the electrolyte, and so on. The gas is supposed to give negative effects to the cell reaction; therefore, means for inhibiting generation of the gas inside the battery and means for discharge the gas inside the battery have been proposed.

For instance, to inhibit generation of gas between an air electrode and an electrolyte, Patent document 1 proposes to raise concentration of active material showing higher oxygen generation potential at the electrolyte side of the electrode. In addition, Patent document 2 discloses an art to produce an air battery comprising gas collection regions and gas discharge pores in a battery case to discharge the gas produced in the battery case. Moreover, Patent document 3 proposes an aluminum-air solid battery characterized in that: an anode and a plurality of cathodes are connected through a solid electrolyte; the anode is made of aluminum or an aluminum alloy; the cathode is made by a plurality of air electrodes; and the anode, the plurality of cathode, and the solid electrolyte are laminated at least a part of the battery.

Patent Document 1: Published Japanese translations of PCT application No. 08-504998
Patent Document 2: Published Japanese translations of PCT application No. 09-500480
Patent Document 3: Japanese Patent Application Laid-Open (JP-A) No. 2006-190522

DISCLOSURE OF THE INVENTION

Problems to be Solved by the Invention

With regard to the air battery of Patent document 1, although it can inhibit generation of the gas to the certain extent at the interface between the air electrode and the electrolyte when charging and/or discharging the battery, once the gas generates, it is impossible to discharge the gas from the battery. About the metal-air battery of Patent document 2, although, among the gas generated in the battery, the gas existing in the vicinity of the battery case can be discharged through the discharge pores formed in the battery case, it is still difficult to direct the gas accumulated at, for example, the interface between the cathode and the electrolyte layer to the case's discharge pores and to discharge the gas. Further, about the aluminum-air solid battery of Patent document 3, it is possible to reduce the effect of discharge inhibitor (alumina) produced at the interface between the air electrode and the solid electrolyte; however, since the battery uses a solid electrolyte, the invention does not concern anything about the effect of gas generated at the interface between the air electrode and the electrolyte layer.

The present inventors had carried out charge-discharge cycle test about a conventional metal-air battery. As a result, in the case of metal-air battery comprising an electrolyte layer disposed at the lower part of the cathode and being formed such that the plane of the cathode layer is disposed to be substantially parallel to the horizontal surface, the inventors discovered that discharge capacity of the battery may suddenly decrease over time. The reason is that bubbles are accumulated at the interface between the cathode and the electrolyte layer; thereby, the bubbles grow to inhibit the cell reaction. Hence, it can be said that the conventional metal-air battery as above has insufficient countermeasures to the gas accumulated at the interface between the cathode and the electrolyte layer.

Accordingly, an object of the present invention is to provide a metal-air battery which can inhibit decrease of discharge capacity and increase of battery's internal resistance caused by the repeated charge and discharge and which can improve the battery performance.

Means for Solving the Problems

As a result of intensive study by the inventors, they discovered that the decrease of discharge capacity and increase of internal resistance can be inhibited by having a battery structure which can inhibit increase in contact area between the cathode and gas accumulated at the interface between the cathode and the electrolyte layer; thus, they arrived at the present invention.

To solve the above problems, the present invention is provided by the following configuration. The first aspect of the invention is a metal-air battery comprising: a cathode; an electrolyte layer; and an anode, wherein the cathode, the electrolyte layer, and the anode are laminated in the order mentioned; the cathode comprises a plurality of cathode material layers arranged at intervals; and the direction for laminating the cathode, the electrolyte layer, and the anode intersects with the array direction of the plurality of cathode material layers.

In the first aspect and the below-described second aspect of the present inventions, the term "cathode material layer" means a layer made of a material to be used as a cathode of the metal-air battery. The term "a plurality of cathode material layers arranged at intervals" includes a form where the plurality of cathode material layers are arranged at intervals through the gaps, a form where a plurality of cathode material layers are laminated through layers different from the cathode material layer, or another form where, in the cathode in section, the plurality of cathode material layers can be seen to be arranged at intervals.

In the first aspect of the invention, the direction for laminating the cathode, the electrolyte layer, and the anode preferably intersects substantially at a right angle with the array direction of the plurality of cathode material layers. Because of this, gas accumulated at the interface between the cathode and the electrolyte layer can be efficiently diffused and removed.

In the first aspect of the invention, the cathode preferably further comprises at least one conductive porous body intervening in the intervals of the plurality of cathode material layers. Due to this, it becomes possible to impart sufficient conductivity to the cathode, to cause smooth discharge by the reaction of oxygen and electrolytic solution existing in the conductive porous body, and to diffuse and remove the gas generated by charging.

Moreover, in the first aspect of the invention, preferably, the cathode comprises a sheet-type cathode material and is configured to be wound. This makes the cathode possible to remove the gas with simple structure.

In the first aspect and the below-described second aspect of the present inventions, the term "the cathode comprises a sheet-type cathode material and is configured to be wound" means that the material to be used as a cathode of the metal-air battery is in a form of sheet and the sheet is spirally wound to produce a laminated form of the plurality of sheets in section. For example, in the case of cathode comprising a cathode material layer and a conductive porous body, the cathode can be formed by winding a laminated sheet of the conductive porous body and the cathode material layer.

Further, in the first aspect of the invention, the anode preferably contains lithium in a metallic state (hereinafter, refer to as "lithium metal".). When containing lithium metal, the discharge capacity of the battery is large and effect of the invention can be remarkably obtained.

The second aspect of the present invention is a method for manufacturing metal-air battery comprising: forming a cathode by arranging a plurality of cathode material layers at intervals; laminating an electrolyte layer on the cathode such that the array direction of the plurality of cathode material layers intersects with the direction for laminating the cathode and the electrolyte layer; and laminating an anode on one side of the electrolyte layer, which is opposite to the side where the cathode is laminated.

In the second aspect of the invention, in the step for forming the electrolyte layer, the electrolyte layer is preferably laminated on the cathode such that the array direction of the plurality of cathode material layers intersects substantially at a right angle with the direction for laminating the cathode and the electrolyte layer. Because of this, gas accumulated at the interface between the cathode and the electrolyte layer can be efficiently diffused and removed.

In the second aspect of the invention, in the step for forming the cathode, at least one conductive porous body is preferably provided to intervene in the intervals of the plurality of cathode material layers. Due to this, it becomes possible to impart sufficient conductivity to the cathode, to cause smooth discharge by the reaction of electrolytic solution and oxygen existing in the conductive porous body, and to diffuse and remove the gas generated by charging.

Moreover, in the second aspect of the invention, in the step for forming the cathode, the cathode is preferably formed by winding a sheet-type cathode material. This makes the cathode with simple structure.

Further, in the second aspect of the invention, the anode preferably contains lithium metal. When containing lithium metal, the discharge capacity of the battery is large and effect of the invention can be remarkably obtained.

Effects of the Invention

According to the first aspect of the present invention, at the interface between the cathode and the electrolyte layer, it is possible to provide a metal-air battery which can inhibit increase in contact area of the cathode and the bubbles; it is also possible to provide a metal-air battery which can inhibit decrease of discharge capacity and increase of battery's internal resistance caused by the repeated charge and discharge. In addition, since oxygen and electrolytic solution can be efficiently reacted by delivering the electrolytic solution in the gaps of the plurality of cathode material layers arranged at intervals, it is possible to provide a metal-air battery which can cause smooth discharge.

According to the second aspect of the invention, at the interface between the cathode and the electrolyte layers, it is possible to provide a method for manufacturing the metal-air battery which can inhibit increase in contact area of the cathode and the bubbles and which can inhibit decrease of discharge capacity and increase of battery's internal resistance caused by the repeated charge and discharge. Moreover, it is possible to provide a method for manufacturing metal-air battery which enables to react oxygen with the electrolytic solution by delivering the electrolytic solution in the gaps of the plurality of cathode material layers arranged at intervals and which can cause smooth discharge.

Figure 1:
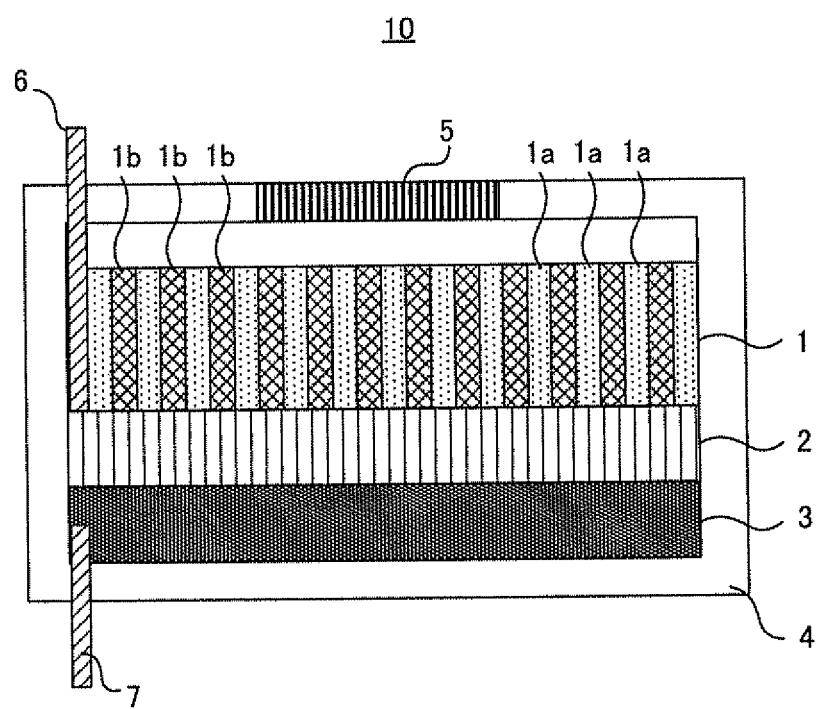
FIG. 1 is a plan schematically showing an internal structure of the metal-air battery.

DESCRIPTION OF THE REFERENCE NUMERALS 1, 1' cathode
1a cathode material layer
1b conductive porous body
2 electrolyte layer
3 anode
4 battery case
5 oxygen supply port
6, 7 electrode terminal
10, 10' metal-air battery

BEST MODE FOR CARRYING OUT THE INVENTION

The mode of the present invention describes a lithium-air battery which comprises, at a time of operation: a cathode, an anode, and an electrolyte layer sandwiched between the cathode and the anode, wherein these are laminated substantially parallel to a horizontal surface. It should be understood that the invention is not particularly limited as long as it is an air battery (zinc-based air battery, aluminum-based air battery, hydrogen air battery, and etc.) in which bubbles are accumulated at the interface between the cathode and the electrolyte layer.

As shown in FIG. 1, the metal-air battery 10 of the first mode of the invention comprises: a cathode 1; an anode 3; an electrolyte layer 2 sandwiched between the cathode 1 and the anode 3; and a battery case 4 incorporating thereof. The battery case 4 has an oxygen supply port 5 is provided, through which air (oxygen) is supplied for cell reaction of the cathode 1. An electrode terminal 6 is provided to the cathode 1, and an electrode terminal 7 is provided to the anode 3; these terminals can supply electric energy generated by the cell reaction to outside the battery.

(Cathode 1)

The cathode 1 provided in the metal-air battery 10 of the invention has a structure in which a plurality of cathode material layers 1a, 1a, . . . and a plurality of the conductive porous bodies 1b, 1b, . . . are alternately laminated. The cathode material layer 1a is a layer made of a material used for conventional cathode to carry out redox reaction of oxygen as the active material. On the other hand, the conductive porous body 1b is a conductive porous body, which can impart sufficient conductivity to the cathode, to cause smooth discharge by the reaction of oxygen and electrolytic solution existing in the conductive porous body 1b, and to remove and inhibit the spread of the gas generated by charging.

The cathode material layer 1a contains an electrical conducting material, a catalyst, and a binder for adhesion thereof. The examples of electrical conducting material include: carbon material of high specific surface area such as carbon black, activated carbon, and carbon fiber. Examples of catalyst include: organic complexes such as cobalt phthalocyanine; inorganic ceramics such as $MnO_2$, $CeO_2$, and metal composite oxide; or a composite materials thereof. As the binder, conventional binder such as PVDF, PTFE, or SBR may be used.

The conductive porous body 1b is not specifically restricted as long as the conductive porous body can intervene in the intervals of the cathode material layer 1a. For instance, a sheet-type carbon paper, a porous sheet made of a conductive polymer, and a metal mesh can be used.

The cathode 1 comprises the cathode material layer 1a and the conductive porous body 1b. The method for producing the cathode 1 will be described in detail in the below-described method for manufacturing metal-air battery.

(Electrolyte Layer 2)

The electrolyte layer 2 provided in the metal-air battery 10 of the invention comprises an electrolyte and a separator. In the mode of the invention, the below-described anode 3 is made of lithium metal so that the electrolyte layer can conduct lithium ions. As the electrolyte, a conventionally-used electrolyte can be used as a lithium ion-conductive electrolyte; particularly, a liquid electrolyte containing a lithium salt is preferably used. Specific examples thereof include a mixture of: $LiClO_4$, $LiPF_6$, $LiBF_4$, $LiAsF_6$, $LiN(CF_3SO_2)_2$, $LiCF_3SO_3$, $LiCF_3CO_2$ or an imide salt of lithium; and a non-aqueous solvent such as propylene carbonate, ethylene carbonate, diethyl carbonate, dimethyl carbonate, ethylmethyl carbonate, 1,2-dimethoxy ethane, 1,2-diethoxy ethane, acetonitrile, propionitrile, tetrahydrofuran, 2-methyl tetrahydrofuran, dioxane, 1,3-dioxolan, nitromethane, N,N-dimethyl formamide, dimethyl sulfoxide, sulfolane, and γ-butyrolactone. The separator may be a conventional separator used for the above electrolyte. Specific examples thereof include: inorganic particles such as alumina, silica, magnesium oxide, titanium oxide, zirconia, silicon carbide, and silicon nitride; organic resin such as polyethylene (PE), polypropylene (PP), polystyrene, polyester, polyacrylonitrile, cellulose, polyimide, and polyamide; or a mixture of the inorganic particles and the organic resins as well as a formed product thereof. By impregnating the separator with these liquid electrolytes, the electrolyte layer 2 can be obtained.

(Anode 3)

The anode 3 provided in the metal-air battery 10 of the invention is not specifically limited as long as it can be used in a metal-air battery. In the mode of the invention, lithium metal or a lithium alloy is used for the anode 3. By making the lithium metal and so on into a thick or thin film, the anode 3 can be produced.

(Battery Case 4)

The metal-air battery 10 of the invention is produced by incorporating the cathode 1, the electrolyte layer 2, and the anode 3 in the battery case 4. The battery case 4 is not specifically limited as long as it is a battery case 4 used as the conventional metal-air battery. Moreover, the battery case 4 has an oxygen supply port 5 in the vicinity of the cathode 1; the air (oxygen) taken from the oxygen supply port 5 is supplied to the cell reaction of the cathode 1. The form of the oxygen supply port 5 may be similar to that of the conventional air battery. From inside to outside the battery case 4, electrode terminals 6, 7 are extended; these are respectively connected to the cathode 1 or the anode 3. Other shapes of the battery case 4 can be appropriately selected depending on the shape of the incorporated cathode 1 and so on; it may be, for example, cylindrical or rectangular shapes.

(Method for Manufacturing Metal-Air Battery)

Figure 2:
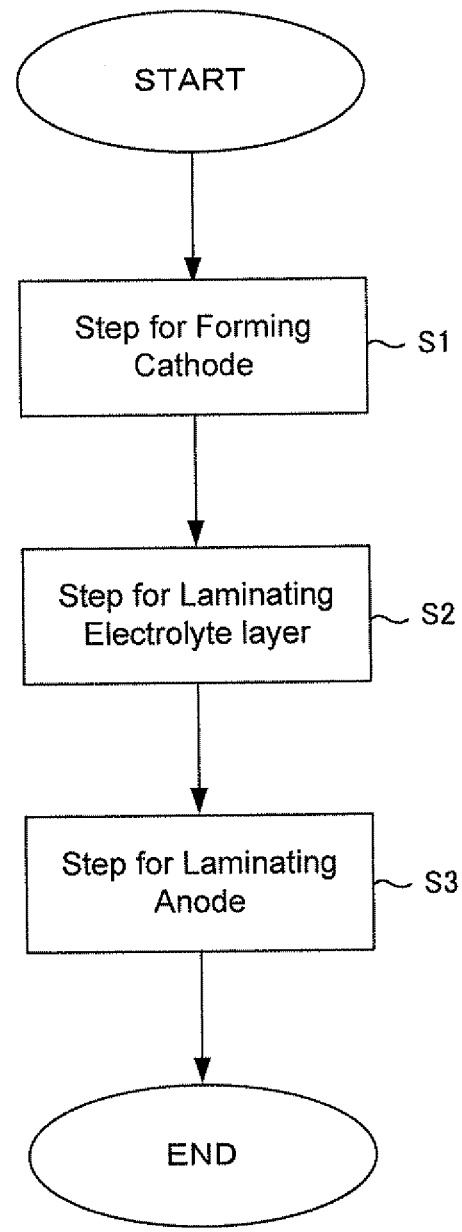
FIG. 2 is a flow chart showing each step of the method for manufacturing the metal-air battery.
Figure 3A:
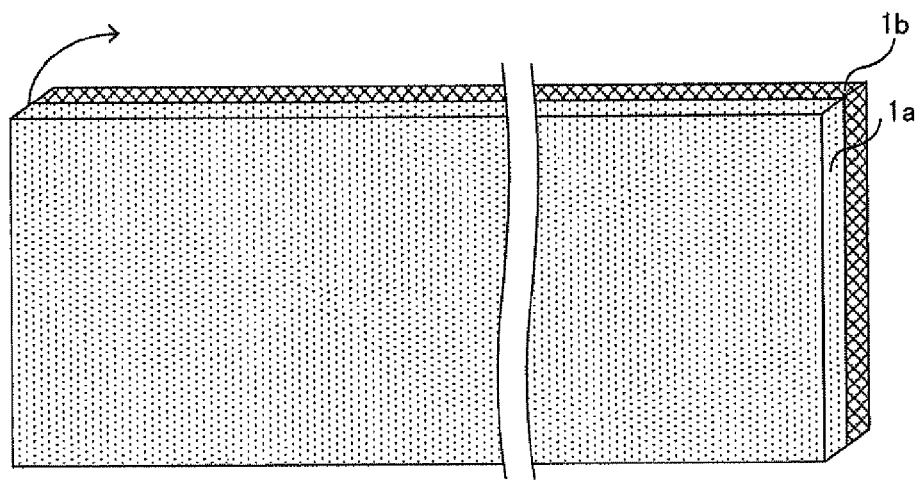
FIGS. 3A and 3B are plans showing an example for producing cathode.
Figure 3B:
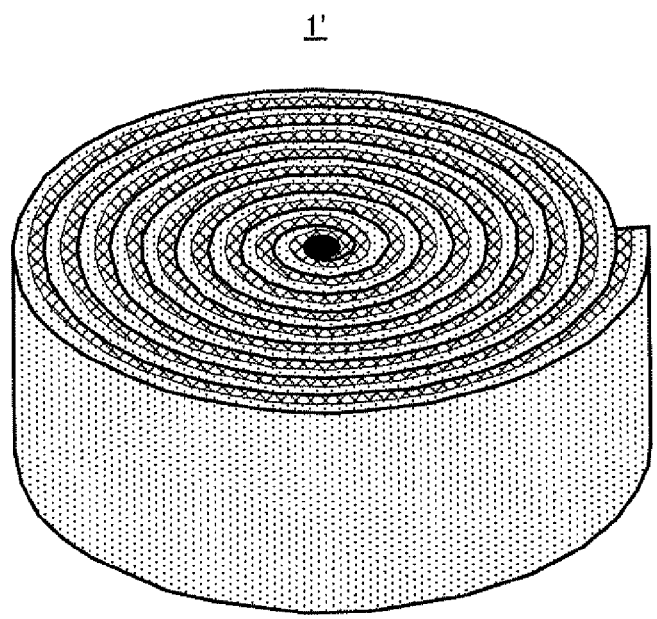
Figure 4A:
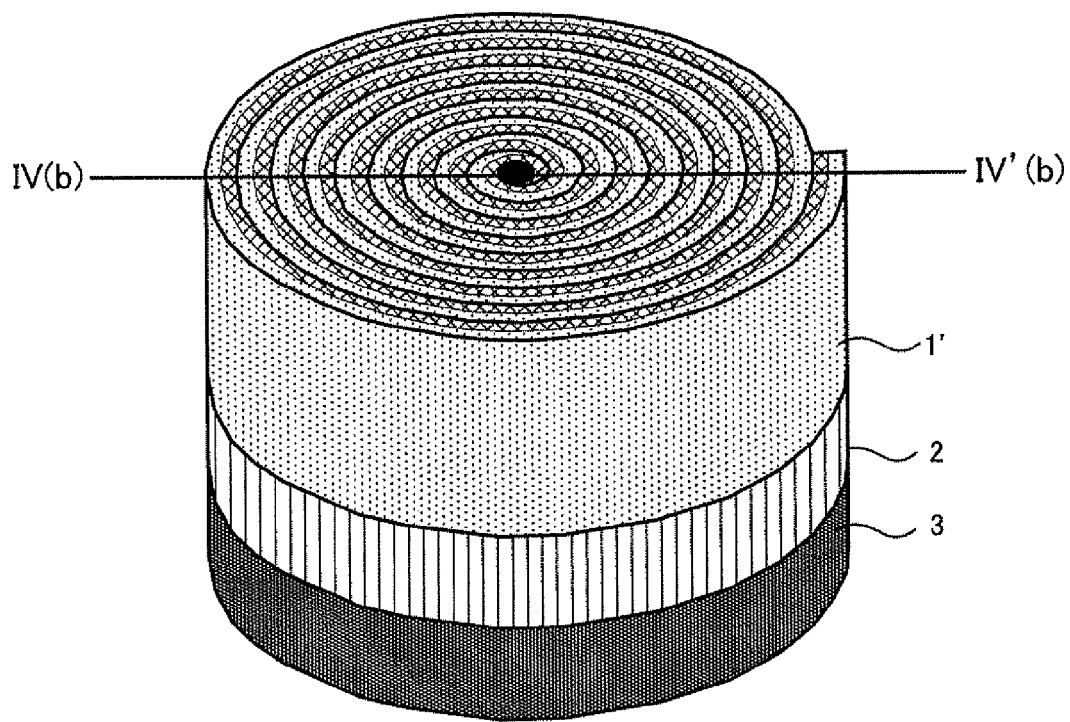
FIGS. 4A and 4B are plans schematically showing a metal-air battery having a cathode shown by FIG. 3.
Figure 4B:
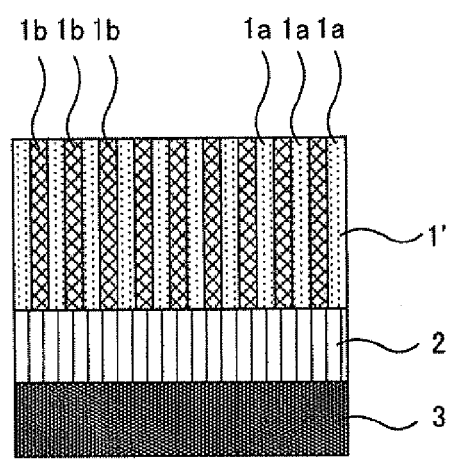

Based on the above components, the above cathode 1, the electrolyte layer 2, and the anode 3 are laminated in the order mentioned, and the laminated body thus obtained is installed in the battery case 4 to produce the metal-air battery of the present invention. Hereinafter, the method for manufacturing metal-air battery will be described. FIG. 2 is a flow chart showing a part of the method for manufacturing the metal-air battery. FIGS. 3A and 3B are plans showing a cathode 1' as a preferable mode of the cathode 1. FIG. 4A is a plan schematically showing a part of the metal-air battery 10' having the cathode 1'; while, FIG. 4B is a plan showing a part of cross-section of the metal-air battery 10' taken along the line IV(b)-IV'(b) of FIG. 4A. In FIGS. 3A and 4A, 4B, to the components same as those of FIG. 1, the same reference numerals are given. Below, the term "cathode 1 (1')" means "cathode 1 or cathode 1'". In addition, the term "metal-air battery 10 (10')" means "metal-air battery 10 or metal-air battery 10'".

FIG. 2 shows steps of the method for manufacturing the metal-air battery 10 (10') of the present mode. The manufacturing method comprises: forming a cathode 1 (1') by arranging a plurality of cathode material layers 1a at intervals (hereinafter, refer to as "Step S1".); laminating an electrolyte layer 2 on the cathode 1 (1') such that the array direction of the plurality of the cathode material layers 1a, 1a, . . . intersects substantially at a right angle with the direction for laminating the cathode 1 (1') and the electrolyte layer 2 (hereinafter, refer to as "Step S2".); and laminating an anode 3 on one side of the electrolyte layer 2, which is opposite to the side where the cathode material layers 1a, 1a, . . . are laminated (hereinafter, refer to as "Step S3".). Each step of the method will be described as follows.

(Step S1)

In Step S1, a cathode 1 (1') is produced. Firstly, a coating material obtained by mixing a solvent with an electrical conducting material, a catalyst, and a binder, as materials of the cathode material layer 1a, is coated over a sheet-type conductive porous body 1b and the coating is dried for removing the solvent to form a cathode material layer 1a on the surface of the sheet-type conductive porous body 1b. The solvent used at the above phase is a volatile liquid such as acetone, DMF, and NMP; a liquid having a boiling point of 200° C. or less is preferable. The coating method of the coating material is not specifically restricted; it may be a known method such as doctor-blade method, dip-coating method, spin-coating method, and spray-coating method.

The cathode 1 (1') is produced by stacking the thus obtained laminated sheet having the cathode material layer 1a and the conductive porous body 1b such that the cathode material layer 1a and the conductive porous body 1b are alternately laminated. When stacking the laminated sheet, the cathode 1 may be produced by preparing the plurality of laminated sheets in advance and then stacking them one after another; in view of producing the laminated body easily and efficiently, the following method is preferable. As it were, as shown in FIG. 3A, the laminated sheet in which the cathode material layer 1a is formed on the conductive porous body sheet 1b is preferably wound using, e.g., a known winding machine to form a roll-type cathode 1' (the state of FIG. 3B). Even by the case, as shown in FIG. 4B, it is still possible to produce the cathode 1' where the cathode material layer 1a, 1a, and the conductive porous body 1b, 1b, . . . are alternately laminated in section. Moreover, to the cathode 1 (1'), a cathode terminal 6 is connected by a known method.

(Step S2)

In Step S2, the electrolyte layer 2 is formed on the above cathode 1 (1'). As shown in FIG. 1 and FIGS. 4A, 4B, the electrolyte layer 2 is laminated on the cathode 1 (1') such that the direction for laminating the cathode 1 (1') and the electrolyte layer 2 intersects substantially at a right angle with the direction for laminating the cathode material layer 1a and the conductive porous body 1b. As above, the electrolyte layer 2 comprises an electrolytic solution and a separator so that the cathode 1 (1') is impregnated with the electrolytic solution such that the electrolytic solution is incorporated in the pores of the conductive porous body 1b. The method for laminating the electrolyte layer 2 on the cathode 1 (1') is not particularly limited; for example, there may be a method comprising: laminating the separator only to the cathode 1 (1'); then, impregnating this with an electrolytic solution. Impregnation of the electrolytic solution may be carried out after the below-described Step S3.

(Step S3)

In Step S3, the anode 3 is formed on one side of the electrolyte layer 2, which is opposite to the side where the cathode 1 (1') is laminated. The method for forming the anode 3 on the electrolyte layer 2 is not specifically limited; a conventional method can be used. To the anode 3, an anode terminal 7 is connected by using a known method.

The laminated body obtained by the steps S1 to S3 is installed in the battery case 4 and is tightly sealed to produce a metal-air battery 10 (10'). It should be noted that the order of Steps S1 to S3 is not particularly limited; the battery may be produced by: preparing a separator, forming the cathode 1 (1') and anode 2 respectively on each side of the separator, impregnating the resultant with an electrolytic solution, and then installing the resultant cell in a battery case.

At charge and discharge of the metal-air battery, as described above, bubbles may be accumulated at the interface between the cathode and the electrolyte layer. Conventionally, the bubbles gradually grow with charge and discharge of the battery; the bubbles eventually cover a large part of the cathode, which results in decrease of discharge capacity and increase of internal resistance. On the other hand, according to the metal-air battery 10 (10') of the mode of the invention, since the cathode material layers 1a, 1a, . . . and the conductive porous bodies 1b, 1b, . . . are alternately laminated in the cathode 1 (1') and the direction for laminating the cathode 1 (1') and the electrolyte layer 2 intersects substantially at a right angle with the direction for laminating the plurality of cathode material layers 1a, 1a, . . . and the conductive porous bodies 1b, 1b, . . . ; so, the bubbles accumulated at the interface between the cathode 1 and the electrolyte layer 2 can be removed from the interface to the oxygen supply port 5 through the conductive porous bodies 1b, 1b, . . . . Therefore, even if the gas is generated at a time of charge or discharge, contact area of the bubbles and the cathode 1 (1') does not increase at the interface between the cathode 1 (1') and the electrolyte layer 2; thereby cell reaction is not inhibited. Hence, it is possible to inhibit decrease of discharge capacity and increase of internal resistance. In addition, by making the conductive porous body 1b intervene in the intervals of the plurality of cathode material layers 1a, 1a, smooth discharge becomes possible because of the reaction of oxygen and an electrolytic solution incorporated in the pores. Accordingly, the metal-air battery 10 (10') enables to inhibit decrease of discharge capacity and increase of battery's internal resistance caused by the repeated charge and discharge and enables efficient discharge.

EXAMPLES

Production of Test Cells for the Example

To produce the test cells for the Example, first of all, the cathode was produced in accordance with the following method.

A carbon paper (manufactured by Toray Industries, Inc.) having a thickness of 300 μm was prepared as a conductive porous body. On the surface of the carbon paper, 5 mg of a mixture, which contains a binder (polyvinylidene fluoride, PVDF), an electrical conducting material (Ketjen black), and a catalyst ($MnO_2$) such that the mass ratio thereof becomes 5:80:15, was applied and dried for forming a cathode material layer having a thickness of 30 μm, to produce a laminated sheet. The laminated sheet, which was wound to have a diameter of 14 mm, was stacked in three rows to produce a cathode having a thickness of 90 μm.

A separator and an anode were disposed on the obtained cathode; these were impregnated with electrolytic solution and then installed in a battery case to produce a test cell of FIG. 1, wherein the direction for laminating the cathode material layer and the conductive porous body intersected substantially at a right angle with the direction for laminating the cathode, the separator, and the anode. As the electrolytic solution, EC/DMC and $LiClO_4$ (1 mol/L) (manufactured by Kishida Chemical Co., Ltd., LBG-00029) were used; as the anode, lithium metal was used.

Production of Test Cell for Comparative Example

The above cathode material layer was applied on a glass surface to produce a cathode having a thickness of 90 μm. The cathode was laminated such that the direction for laminating the cathode material layer and the glass becomes substantially the same as the direction for laminating the cathode, the separator, and the anode; then, the resultant was impregnated with the electrolytic solution and finally installed in a battery case, to produce a test cell. About the cathode material layer, the electrolytic solution, and the anode, the same materials as those used for the test cell of the Example were used.

(1) Discharge Characteristics

About each test cell, after charging 2.8 V, discharge characteristics were evaluated. The test was carried out at a current density of 0.05 $mA/cm^2$ per electrode area under a pure oxygen atmosphere (oxygen: 99.999%, $1.013 \times 10^5$ Pa). The result is shown in FIG. 5.

Figure 5:
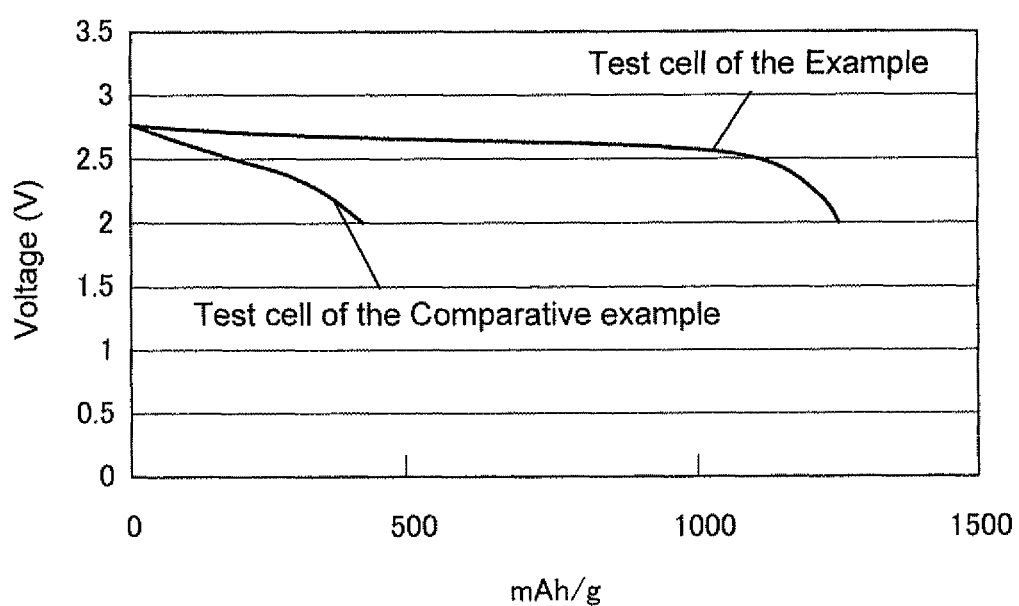
FIG. 5 is a graph showing the evaluation results of discharge characteristics about the Example and Comparative example.

As seen from the result shown in FIG. 5, discharge capacity of the test cell of the Example is about three times as much as that of the test cell of the Comparative example. Therefore, in the manner of the test cell of the Example, when causing cell reaction by providing conductive porous body to the cathode and incorporating electrolytic solution in the pores of the conductive porous body, smooth discharge becomes possible whereby the discharge capacity can be improved.

(2) Charge-Discharge Cycle Test

About each test cell, after 20-cycle charge and discharge, change of battery's internal resistance was evaluated. As a result, about the test cells of the Example, increase of battery's internal resistance was not observed. Moreover, when the test cells were taken out from the battery and the battery was torn apart for observing the internal state, no bubble was remained at the interface between the cathode and the electrolyte layer.

On the other hand, about the test cell of the Comparative example, by repeated charge and discharge, 100 times increase in battery's internal resistance was observed compared with the initial internal resistance of the battery. Moreover, when the test cells were taken out from the battery and the battery was torn apart for observing the internal state, there was a large bubble remained at the interface between the cathode and the electrolyte layer. As above, it has been discovered that the test cells of the Example can inhibit increase of internal resistance and decrease of discharge capacity caused by the repeated charge and discharge.

In the mode of the present invention, the metal-air battery 10 having the anode 3 made of lithium metal was described; the invention is not specifically restricted by the mode of the invention. The metal-air battery may have anode using metal such as zinc, magnesium, aluminum, and calcium. In such a case, depending on the material of the anode, the electrolytic solution is adequately selected.

The mode of the invention was described, as a preferable one, such that the direction for laminating the cathode material layer 1a and the conductive porous body 1b intersects substantially at a right angle with the direction for laminating the electrolyte layer 2 and the anode 3; the invention is not specifically restricted by the mode. Except for the case where the direction for laminating the cathode material layer 1a and the conductive porous body 1b is substantially parallel to the direction for laminating the electrolyte layer 2 and the anode 3, any modes can be adopted for the invention. However, in view of immediate diffusion and removal of the gas at the interface between the cathode 1 and the electrolyte layer 2, the direction for laminating the cathode material layer 1a and the conductive porous body 1b preferably intersects substantially at a right angle with the direction for laminating the electrolyte layer 2 and the anode 3.

In the mode of the invention, the metal-air battery 10 having the conductive porous body 1b in the intervals of the cathode material layers 1a, 1a was described; the invention is not restricted by the mode. The cathode may have gaps between the cathode material layers 1a, 1a arranged at intervals by removing a part or all of the conductive porous bodies 1b, 1b.

The above has described the present invention associated with the most practical and preferred embodiments thereof. However, the invention is not limited to the embodiments disclosed in the specification. Thus, the invention can be appropriately varied as long as the variation is not contrary to the subject substance and conception of the invention which can be read out from the claims and the whole contents of the specification. It should be understood that metal-air battery and the method for manufacturing the metal-air battery with such an alternation are included in the technical scope of the invention.

INDUSTRIAL APPLICABILITY

The metal-air battery of the present invention exhibits excellent charge-discharge performance and enables smooth discharge, thereby it is expected to be used for various power source such as a power source of small devices as well as a power source of electric vehicles and hybrid cars.

The invention claimed is:

1. A metal-air battery comprising: a cathode; an electrolyte layer; and an anode,
   the cathode, the electrolyte layer, and the anode being laminated in the order mentioned,
   the cathode comprising a plurality of cathode material layers arranged at intervals, the cathode material layers comprising a catalyst,
   the cathode having a gap between the cathode material layers being closest to each other,
   the direction for laminating the cathode, the electrolyte layer, and the anode intersecting with the array direction of the plurality of cathode material layers,
   an electrolytic solution being delivered in the gaps between the cathode material layers being closest to each other,
   the gap penetrating the cathode to the electrolyte layer, thereby gas accumulated at the interface between the cathode and the electrolyte layer can be diffused and removed through the gaps.

2. The metal-air battery according to claim 1, wherein the direction for laminating the cathode, the electrolyte layer, and the anode intersects substantially at a right angle with the array direction of the plurality of cathode material layers.

3. A metal-air battery comprising: a cathode; an electrolyte layer; and an anode,
   the cathode, the electrolyte layer, and the anode being laminated in the order mentioned,
   the cathode comprising a plurality of cathode material layers arranged at intervals, the cathode material layers comprising a catalyst,
   the direction for laminating the cathode, the electrolyte layer, and the anode intersecting with the array direction of the plurality of cathode material layers, and
   the cathode further comprising at least one conductive porous body without a catalyst intervening in the intervals between the plurality of cathode material layers being closest to each other.

4. A metal-air battery comprising: a cathode; an electrolyte layer; and an anode,
   the cathode, the electrolyte layer, and the anode being laminated in the order mentioned,
   the cathode comprising a plurality of cathode material layers which are made of a sheet-type cathode material comprising a catalyst, are configured to be wound, and are arranged at intervals,
   at least one conductive porous body without a catalyst intervening the intervals between the cathode material layers being closest to each other, and
   the direction for laminating the cathode, the electrolyte layer, and the anode intersecting with the array direction of the plurality of cathode material layers.

5. A metal-air battery comprising: a cathode, an electrolyte layer, and an anode;
   the cathode, the electrolyte layer, and the anode being laminated in the order mentioned, the cathode comprising a plurality of cathode material layers which are made of a sheet-type cathode material comprising catalyst, are configured to be wound, and are arranged at intervals, the cathode having a gap between the cathode material layers being closest to each other, an electrolytic solution being delivered in the gaps between the cathode material layers being closest to each other, the direction for laminating the cathode, the electrolyte layer, and the anode intersecting with the array direction of the plurality of cathode material layers, and the gap penetrating the cathode to the electrolyte layer, thereby gas accumulated at the interface between the cathode and the electrolyte layer can be diffused and removed through the gaps.

6. A method for manufacturing metal-air battery comprising:

forming a cathode by arranging a plurality of cathode material layers at intervals, the cathode material layers comprising a catalyst, the cathode having a gap between the cathode material layers being closest to each other;

laminating an electrolyte layer on the cathode such that an electrolytic solution is delivered in the intervals between the cathode material layers being closest to each other and the array direction of the plurality of cathode material layers intersects with the direction for laminating the cathode and the electrolyte layer, the gap penetrating the cathode to the electrolyte layer, thereby gas accumulated at the interface between the cathode and the electrolyte layer can be diffused and removed through the gaps; and laminating an anode on one side of the electrolyte layer, which is opposite to the side where the cathode is laminated.

7. The method for manufacturing metal-air battery according to claim 6, wherein the anode contains lithium in a metallic state.

8. The method for manufacturing metal-air battery according to claim 6, wherein in the step for forming the electrolyte layer, the electrolyte layer is laminated on the cathode such that the array direction of the plurality of cathode material layers intersects substantially at a right angle with the direction for laminating the cathode and the electrolyte layer.

9. The method for manufacturing metal-air battery according to claim 8, wherein the anode contains lithium in a metallic state.

10. A method for manufacturing metal-air battery comprising:

forming a cathode by arranging a plurality of cathode material layers at intervals, the cathode material layers comprising a catalyst, and providing at least one conductive porous body without a catalyst to intervene in the intervals between the plurality of cathode material layers being closest to each other;

laminating an electrolyte layer on the cathode such that the array direction of the plurality of cathode material layers intersects with the direction for laminating the cathode and the electrolyte layer; and laminating an anode on one side of the electrolyte layer, which is opposite to the side where the cathode is laminated.

11. The method for manufacturing metal-air battery according to claim 10, wherein the anode contains lithium in a metallic state.

12. A method for manufacturing metal-air battery comprising:

forming a cathode by winding a sheet-type cathode material and arranging a plurality of the cathode material layers at intervals, the cathode material layers comprising a catalyst, and by providing at least one conductive porous body without a catalyst to intervene in the intervals between the plurality of cathode material layers being closest to each other;

laminating an electrolyte layer on the cathode such that the array direction of the plurality of cathode material layers intersects with the direction for laminating the cathode and the electrolyte layer; and laminating an anode on one side of the electrolyte layer, which is opposite to the side where the cathode is laminated.

13. The method for manufacturing metal-air battery according to claim 12, wherein the anode contains lithium in a metallic state.

* * * * *